(No Model.)

M. J. GUTHRIE.
BICYCLE SUPPORT.

No. 585,338. Patented June 29, 1897.

WITNESSES

INVENTOR
Martha J. Guthrie
BY
Edgar Tate & Co
ATTORNEYS.

UNITED STATES PATENT OFFICE.

MARTHA JANE GUTHRIE, OF WICHITA, KANSAS.

BICYCLE-SUPPORT.

SPECIFICATION forming part of Letters Patent No. 585,338, dated June 29, 1897.

Application filed November 25, 1896. Serial No. 613,371. (No model.)

*To all whom it may concern:*

Be it known that I, MARTHA JANE GUTHRIE, a citizen of the United States, residing at Wichita, in the county of Sedgwick and State of Kansas, have invented certain new and useful Improvements in Bicycle-Supports, of which the following is a full and complete specification, such as will enable those skilled in the art to which it appertains to make and use the same.

This invention relates to supports for bicycles; and the object thereof is to provide an improved device of this class which is designed to support the bicycle in an upright position and which is adapted to be connected with the frame thereof and to operate in a manner hereinafter described.

The invention is fully disclosed in the following specification, of which the accompanying drawings form a part, in which the separate parts of the device are indicated by the same numerals of reference throughout the several views, and in which—

Figure 1:
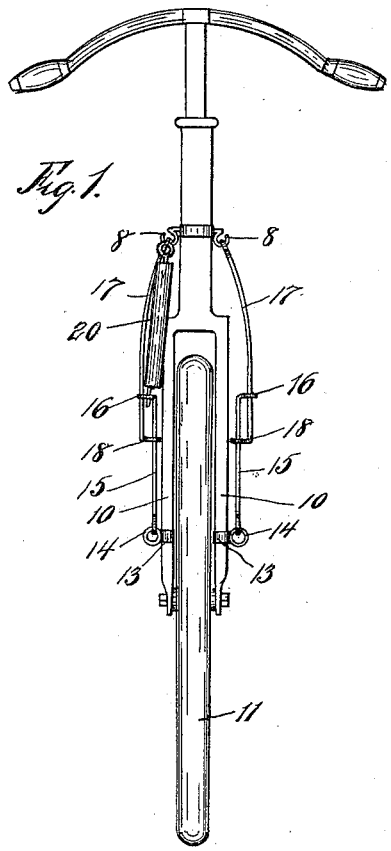
Figure 2:
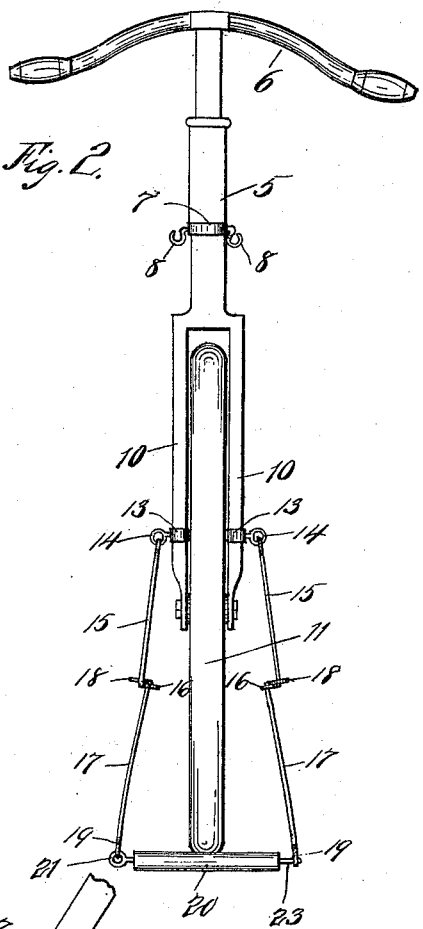

Figure 1 is a front view of a bicycle provided with my improved support and showing it in the raised position, or the position occupied thereby when the bicycle is in use; Fig. 2, a similar view showing the support lowered, so as to support the bicycle; and Fig. 3, a partial side view of the vehicle.

My invention is applicable to frames of bicycles as usually constructed; and in the practice thereof I secure to the forward upright tube 5, which forms a part of the frame and with which the handle-bar 6 is connected, a clamp or band 7, which is provided at its opposite sides with downwardly and upwardly curved hooks 8, and I also connect with the sides 10 of the forward yoke, in which the drive-wheel 11 is mounted, clamps or bands 13, each of which is provided with an eye or ring 14.

Connected with the eyes or rings 14 of the clamps or bands 13 at each side is a rod 15, said rods being provided in their upper ends with eyes or rings which engage with eyes or rings 14, and each of the rods 15 is provided at its lower end with an inwardly-directed ring or loop, and I also provide two supplemental rods 17, the upper ends of which are passed through the rings or loops 16 and provided with similar rings or loops 18, through which the rods 15 are passed, and said rods 17 are thus free to slide on the rods 15.

The lower ends of the supplemental rods 17 are provided with rings or eyes 19, and I also provide a cross-bar 20, which is connected at one side with one of the supplemental rods 17 by means of an eye or ring 21 and which is provided at its opposite ends with a projection 23, which is adapted to pass through the eye or ring 19 at the lower end of the opposite supplemental rod 17.

Figure 3:
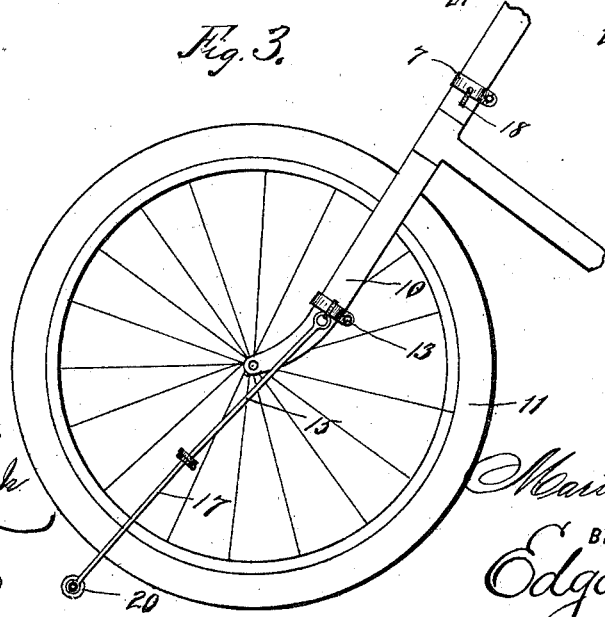

By means of the connection of the supplemental rods 17 with the rods 15, as described, they are free to slide thereon and are held at any desired point by friction, and when the support is not in use the projection 23 of the cross-bar 20 is disconnected from the adjacent supplemental rod 17 and the support is raised into the position shown in Fig 2, the lower ends of the supplemental rods 17 being connected with the hooks 8 of the clamp or band 7, and in this position the cross-bar 20 is suspended from the supplemental rod 17, with which the ring or eye 21 is connected, and the projection 23 of the bar 20 enters the eye or ring 16 of the adjacent rod 15, as clearly shown in said figure, and whenever it is desired to use the device to support the bicycle in an upright position the ends of the supplemental rods 17 are disconnected from the hooks 18 and swung down into the position shown in Fig. 3 and the free end of the cross-bar 20 is connected with the corresponding supplemental rod 17, as shown in said figure.

It will thus be seen that the side rods of the support, which are composed of adjustable sections, are pivotally connected with or hinged to the clamps or bands 13 and are adapted to swing thereon, and that the connection of the cross-bar 20 with one of said side rods is also a pivotal or hinged connection, and said cross-bar is adapted when in the position shown in Figs. 2 and 3 to rest upon the ground and thus form a support for the vehicle.

My improved support for bicycles is simple in construction and operation and comparatively inexpensive and is well adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

1. A support for bicycles consisting of clamps or bands connected with the lower ends of the sides of the front yoke, side rods pivotally connected therewith, and composed of adjustable sections, one of the outer sections being provided with a cross-bar which is pivotally connected therewith, and which is adapted to be detachably connected with the opposite outer sections, and said side rods being adapted to be swung upwardly, and to be connected with hooks formed on or secured to a clamp or band mounted on the forward upright tube of the frame, substantially as shown and described.

2. The combination with the forward upright rod of a bicycle-frame, of a clamp or band mounted thereon, and provided with side hooks, and a support consisting of side rods pivotally connected with the lower portion of the forward fork, at each side thereof, said side rods being composed of adjustable sections, and the ends thereof opposite their pivotal connection with the yoke being provided with a cross-bar which is pivotally connected or hinged to one, and adapted to be detachably connected with the other, said side rods being adapted to be raised and connected with the hook of the forward upright tube, substantially as shown and described.

In testimony that I claim the foregoing as my invention I have signed my name, in presence of the subscribing witnesses, this 31st day of October, 1896.

MARTHA JANE GUTHRIE.

Witnesses:
T. B. WALL,
C. H. BROOKS.